Feb. 6, 1934. H. C. DRAKE ET AL 1,946,196

METHOD AND MEANS FOR DETECTING FLAWS

Filed March 18, 1933

Inventors
Harcourt C. Drake
Loren J. Delanty
By Joseph H. Lipschutz
Attorney

Patented Feb. 6, 1934

1,946,196

UNITED STATES PATENT OFFICE 1,946,196

METHOD AND MEANS FOR DETECTING FLAWS

Harcourt C. Drake, Hempstead, and Loren J. De Lanty, Spring Valley, N. Y., assignors to Sperry Products, Inc., Brooklyn, N. Y., a corporation of New York Application March 18, 1933. Serial No. 661,484

10 Claims. (Cl. 175—183)

This invention relates to a method of and means for detecting internal fissures in electrical conductors and magnetizable objects. The invention has application to the general method of testing which consists in energizing a conductor with flux either by passing current therethrough or by magnetizing the object under test by means of an electromagnet. While the object under test is uniform there is uniformity in the flux but when a region of flaw is encountered the flux is distorted and such distortion is detected by suitable detecting means.

It is one of the prinicipal objects of our invention to provide a new method of detecting fissures in electrical conductors and magnetizable objects which will perform the important function of differentiating internal fissures from mere surface defects. Surface defects such as burns on rail surfaces are not the type of defect which it is the function of these devices to discover, since such surface defects are not defects in the internal structure of the conductor or magnetizable object and the principal purpose of these detecting devices is to detect internal defects.

By our invention we supply a means whereby it is possible readily to differentiate between surface defects and internal fissures.

Further objects and advantages of this invention will become apparent in the following detailed description.

In the accompanying drawing.

Figure 1:
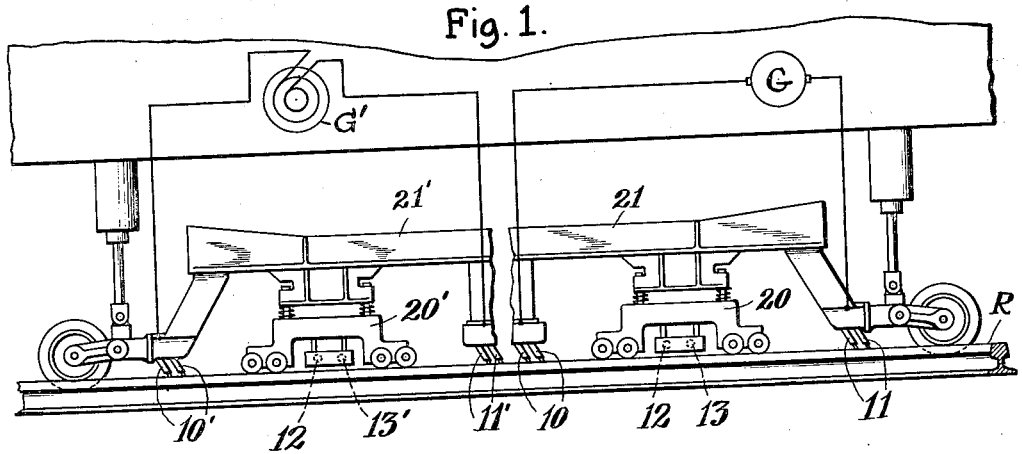
Fig. 1 is a side elevation of a portion of a car adapted to travel along rails and having our invention applied thereto.
Figure 2:
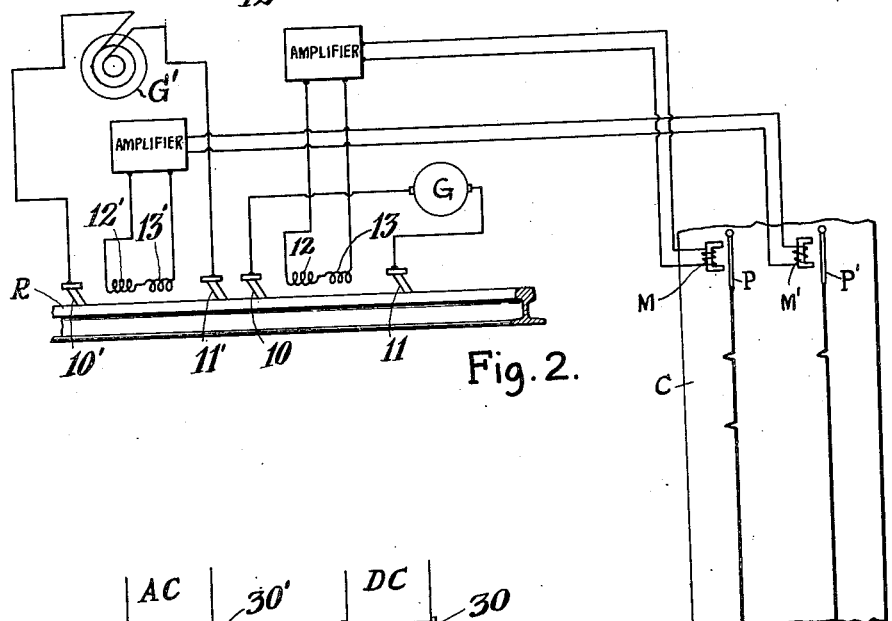
Fig. 2 is a diagrammatic representation of the principle underlying our invention.
Figure 3:
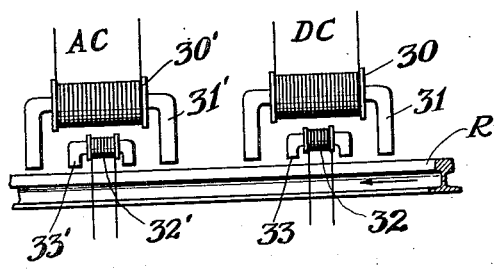
Fig. 3 is a modified form of the invention disclosed in Figs. 1 and 2.

Referring first to Fig. 2, there is illustrated a method which is now extensively employed in the testing of electrical conductors such as a rail R. In this form, current is supplied to the rail from a generator G by means of brushes 10 and 11 in engagement with the conductor to establish an electromagnetic field surrounding the conductor. Detector means such as a pair of opposed coils 12, 13, maintained in constant relation to the conductor surface is moved therealong to cut the lines of force surrounding the conductor. When a region of flaw is encountered one coil enters said region before the other and thus there is induced a differential E. M. F. between said coils which may be suitably indicated, as, for instance, by a recording pen P operating on a chart C, said pen forming the armature of a relay M which may be energized by said differential induced E. M. F. by way of a suitable amplifier. The difficulty arising in the use of this method has been the elimination of surface defects which, as hereinbefore explained, are not the defects which it is desired to detect. Various methods have been worked out for reducing the number of such surface defects which are picked up, one of these methods being that shown in Fig. 1 wherein a small detector carriage 20 is mounted on a current brush carriage 21 which supports the current brushes 10 and 11, said detector carriage 20 being so mounted on the current brush carriage 21 as to permit movement independent of the current brush carriage and thus the detector carriage may align itself with the irregularities in the surface to maintain the coils 12, 13 at all times a constant distance above the rail even when passing over surface defects.

By this invention we provide another method for segregating indications due to internal defects from those due to surface defects. For this purpose we propose the following method and apparatus:

It is well known that while direct current tends to pass into the center of a conductor, alternating current tends to cling to the surface and there is obtained a very marked skin effect, that is, the current clings to the periphery of the conductor. If therefore, alternating current of a predetermined frequency is supplied to a conductor R from a generator G' by way of brushes 10', 11' said current will cling to the surface of the conductor and will not be affected by internal defects but only by surface defects, so that only the latter will cause distortion of the electromagnetic field surrounding the conductor, and hence the differential E. M. F. which is picked up by a pair of opposed coils 12', 13' supported on a carriage 20' will indicate only a surface defect. Said differential E. M. F. may be caused to operate a pen P' similar to pen P actuated by relay M' or energized from the output of an amplifier which suitably amplifies the differential E. M. F. induced by coils 12', 13'. The carriage 20' may be supported on the same current brush carriage 21 which supports carriage 20, said carriages 20 and 20' being spaced from one another, or carriage 20' may be supported on a separate current brush carriage 21'.

We cause the pen P' to make a record on the same chart C parallel to the record made by pen P. We now have the following situation—coils 12 and 13 will induce a differential E. M. F. when a defect is present whether said defect is due to an internal defect or a surface defect, while coils 12', 13' will induce an E. M. F. only when there is a surface defect. If, therefore, as indicated on the chart, both pens give an indication at the same point it means that the indication is due to a surface defect. While if pen P gives an indication such indication must be due to an internal defect. Thus we have provided a method and means for differentiating indications due to surface defects from indications due to internal defects.

The same principle may be applied to testing of magnetizable objects wherein it has been customary to energize the object R with flux from an electromagnet. Thus, an electromagnet 30 may be provided for energizing the object under test, in this case, the conductor R with flux by way of a core 31 in the form of an inverted U, the conductor forming a closure between the arms of the U. Flux extends through the conductor in the direction of the arrow and when a region of flaw is encountered certain of the flux is distorted and is picked up in a shunt magnetic circuit formed by core 33 similar to core 31 to induce a voltage in a coil 32 carried by said core.

Here, too, if direct current is employed in magnet 30 the flux passes into the magnetizable object to the center thereof, so that defects will be picked up as well as internal defects; while if an alternating current is employed in the coil 30 the flux clings to the surface of the object under test so that internal defects are not picked up. We may therefore provide a coil 30' similar to coil 30 but adapted to be energized by alternating current to establish an A. C. magnetic path through the magnetizable object by way of core 31' similar to core 30. The variations in flux will be detected by means of the shunt magnetic path formed by core 33' to induce an E. M. F. in coil 32' carried thereby. The output from coils 32, 32' may be caused to operate pens P and P' in the same manner as the output from coils 12, 13 and 12', 13'.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. The method of detecting defects in electrical conductors and magnetizable objects, and for differentiating between internal defects and other defects, which consists in energizing the object under test with both D. C. and A. C. flux, detecting variations in each type of flux and comparing said variations.

2. The method of detecting defects in electrical conductors and magnetizable objects, and for differentiating between internal defects and other defects, which consists in energizing the object under test with both D. C. and A. C. flux, first with one type of flux and then with the other type of flux in succession, detecting variations in each type of flux, and comparing said variations.

3. The method of detecting defects in electrical conductors, and for differentiating between internal defects and other defects, which consists in passing alternating and direct current through the conductor, detecting variations in the electromagnetic fields created by each type of current, and comparing said variations.

4. The method of detecting defects in electrical conductors, and for differentiating between internal defects and other defects, which consists in passing alternating and direct current through the conductor, first with one type and then with the other type in succession, detecting variations in the electromagnetic fields created by each type of current and comparing said variations.

5. A device for detecting flaws in electrical conductors and for differentiating between internal defects and other defects, comprising means for passing direct current through the conductor under test, means responsive to variations in the electromagnetic field set up by said direct current, an indicator actuated by said variations, means for passing alternating current through the conductor under test, means responsive to variations in the electromagnetic field set up by said alternating current, and an indicator actuated by said last-named variations.

6. A device for detecting flaws in electrical conductors and for differentiating between internal defects and other defects, comprising means for passing direct current through the conductor under test, means responsive to variations in the electromagnetic field set up by said direct current, an indicator actuated by said variations, means for passing alternating current through the conductor under test, means responsive to variations in the electromagnetic field set up by said alternating current, and an indicator in comparative relation to said first indicator and actuated by said last-named variations.

7. A device for detecting flaws in electrical conductors and for differentiating between internal defects and other defects, comprising means for passing direct current through the conductor under test, means responsive to variations in the electromagnetic field set up by said direct current, an indicator actuated by said variations, means for passing alternating current through the conductor under test, means responsive to variations in the electromagnetic field set up by said alternating current, and an indicator actuated by said last-named variations, said conductor being energized first with one type of current and then with the other type in succession.

8. A device for detecting flaws in magnetizable objects, and for differentiating between internal defects and other defects, comprising a magnetic circuit including a portion of the object under test, means for energizing said circuit with D. C. flux, means responsive to variations in flux through said object, a second magnetic circuit including a portion of said object, means for energizing said second circuit with A. C. flux, and means responsive to variations in said last-named flux through said object.

9. A device for detecting flaws in magnetizable objects, and for differentiating between internal defects and other defects, comprising a magnetic circuit including a portion of the object under test, means for energizing said circuit with D. C. flux, means responsive to variations in flux through said object, means for indicating said variations, a second magnetic circuit including a portion of said object, means for energizing said second circuit with A. C. flux, means responsive to variations in said last-named flux through said object, and means for indicating said last-named variations.

10. A device for detecting flaws in magnetizable objects, and for differentiating between internal defects and other defects, comprising a magnetic circuit including a portion of the object under test, means for energizing said circuit with D. C. flux, means responsive to variations in flux through said objects, means for indicating said variations, a second magnetic circuit including a portion of said object, means for energizing said second circuit with A. C. flux, means responsive to variations in said last-named flux through said object, and means in cooperative relation to said first indicating means for indicating said last-named variations.

HARCOURT C. DRAKE.
LOREN J. DE LANTY.